United States Patent
Wheatley et al.

(10) Patent No.: US 7,602,729 B2
(45) Date of Patent: Oct. 13, 2009

(54) SLOW-FAST PROGRAMMING OF DISTRIBUTED BASE STATIONS IN A WIRELESS NETWORK

(75) Inventors: Paul James Wheatley, Titusville, NJ (US); Chen-Huan Chiang, Princeton Junction, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 818 days.

(21) Appl. No.: 10/893,215

(22) Filed: Jul. 19, 2004

(65) Prior Publication Data

US 2006/0013167 A1    Jan. 19, 2006

(51) Int. Cl.
*G01R 31/08* (2006.01)
*G01R 31/28* (2006.01)
*H04W 4/00* (2006.01)

(52) U.S. Cl. .................. 370/249; 370/242; 370/328; 714/727

(58) Field of Classification Search .......... None
See application file for complete search history.

(56) References Cited

U.S. PATENT DOCUMENTS

| | | | |
|---|---|---|---|
| 5,079,696 A * | 1/1992 | Priem et al. .......... | 709/237 |
| 6,188,912 B1 * | 2/2001 | Struhsaker et al. .......... | 455/561 |
| 2002/0097682 A1 * | 7/2002 | Enam et al. .......... | 370/241 |
| 2002/0122477 A1 * | 9/2002 | Murata .......... | 375/225 |
| 2002/0159393 A1 * | 10/2002 | Smith et al. .......... | 370/249 |
| 2003/0099238 A1 * | 5/2003 | Payne et al. .......... | 370/394 |
| 2003/0179831 A1 * | 9/2003 | Gupta et al. .......... | 375/296 |
| 2004/0179852 A1 * | 9/2004 | Westbrook et al. .......... | 398/183 |
| 2004/0252709 A1 * | 12/2004 | Fineberg .......... | 370/412 |
| 2005/0060487 A1 * | 3/2005 | Barth et al. .......... | 711/105 |
| 2005/0286507 A1 * | 12/2005 | Sterling et al. .......... | 370/363 |
| 2006/0050640 A1 * | 3/2006 | Jin et al. .......... | 370/235 |

* cited by examiner

*Primary Examiner*—Kwang B Yao
*Assistant Examiner*—Jutai Kao

(57) ABSTRACT

A slow fast programming method for efficient remote field update in distributed base stations overcomes significant fiber propagation delay associated with a remote unit by applying programming data at two clock frequencies. A fast clock frequency is used for programming data phases that do not require a response from the remote unit, and a slow clock frequency is used for programming data phases that require a response from the remote unit. Testing a base unit and a remote unit is also accomplished with more than one clock based on the test dependence on a remote response.

20 Claims, 4 Drawing Sheets

SLOW-FAST PROGRAMMING OF DISTRIBUTED BASE STATIONS IN A WIRELESS NETWORK

CROSS REFERENCES

This application is concurrently filed and co-pending with U.S. non-provisional application titled "DISTRIBUTED BASE STATION TEST BUS ARCHITECTURE IN A WIRELESS NETWORK" Ser. No. 10/893,216 which is incorporated herein by reference.

BACKGROUND

As shown in FIG. 1, a traditional base station 100 usually consists of controller boards 101, channel cards 102, clocking units 103 and radio cards 104, which all reside on a system backplane in the same chassis which includes a test bus 120 and a system bus 130. The system level test bus architecture is an extended Boundary Scan (BS) multi-drop bus architecture. It is made of the five BS TAP signals and contains a boundary scan master (BSM) 121 as a test bus master in the controller board 101. The controller board (card) 101 also includes a microprocessor 122. Each of the other boards contains an addressable scan port (ASP) device 115 as a test bus slave. This multi-drop test architecture supports embedded boundary scan, where the BS tests are embedded on the controller board 101 and executed by the microprocessor 122 as a part of system functions during field operation.

A Distributed Base Station (DBS) 200 is shown in FIG. 2, the Base Band Unit (BBU) 250 consists of controller boards 201, channel cards 202, clocking units 203 and fiber interface units (FIU) 206, as well as other types of cards not shown for reasons of clarity, on one local backplane which includes a test bus 220 and a system bus 230. A single-bit fiber 260 connects the BBU 250 with a radio frequency unit (RFU) 270 which consists of a radio card 204 and a fiber interface adapter (FIA) 207. The FIA 207 acts as a remote and distributed backplane for the radio card 204 in RFU 270. Furthermore, communication between BBU 250 and RFU 270 is accomplished by the communication of FIU 206 and FIA 207 via the long single-bit fiber cable 260. The FIU 206 and FIA 207 also include a serializer and de-serializer (SerDes) 209a, 209b which serialize and deserialize the data to and from, respectively, the single bit fiber cable 260. Over sampling and multiplexing design techniques must also be implemented due to the limited bandwidth between the pair SerDes 209a and 209b as shown in FIG. 2.

The DBS's unique distributed design enables mobile operators to deploy the RFUs 270, the components of a base station that send and receive radio signals, and power system separately from the BBUs 250, the components of a base station that process and send the radio signals to and from a mobile switching center (not shown). The RFUs 270 and BBUs 250 can be connected by a customer-provided single-mode fiber cable 260 at distances of 12 km or even higher. These single mode fiber cables can also include other types of tethers commonly used as backhaul, such metallic wire lines.

For example, in an urban environment, multiple BBUs 250 can be deployed at a company maintenance facility and connected to a mobile switching center via a T1 line, while the RFUs 270 are deployed miles away near major highways, train and bus stations and hospitals and are connected to the BBUs 250 via the single-mode fiber cable 260.

The DBS provides a compact, low cost unit for small or entry-level networks. It is designed for suburban build-out, hole filling, hot spots, in-building or any broad coverage, medium capacity network need. Flexible mounting options include poles, walls, roofs and various configurations in buildings.

A DBS is designed for increased capacity and coverage in the smallest footprint. Its compact construction reduces space requirements and real estate costs, which may significantly shorten the time to market through rapid site selection and zoning. In addition, the overall quality of network service improves via the ability of the DBS to provide coverage for a variety of environments. Furthermore, the DBS can use remote software control for remote maintenance, which results in fewer on-site visits and trimmed travel and labor costs.

The current disclosure presents a third-generation (3G) CDMA 2000 base station that, because of its compact design and distributed architecture, offers the flexibility needed to meet a variety of deployment needs and coverage challenges for mobile operators.

However, the DBS poses great challenges for system testing and field update operation due to its distributed architecture since only a serial channel exists between the local and remote backplanes. More importantly, the serial channel is a functional channel, rather than a dedicated test channel such as the five BS TAP signals which connect the cards to the test bus 220.

One challenge is that the FIA 207 of the DBS is not only a distributed backplane for a radio, card 204 but also the FIA 207 is a board in the distributed system. The problem arises how to effectively test the FIA 207 and the radio card 204 during system integration test and field operation.

The long fiber 260 causes significant propagation delay, which limits BS test clock (TCK) frequency. Usually a single-mode fiber incurs a 5 μs propagation delay per kilometer. For example, a 10 km long fiber (i.e., 20 km roundtrip) incurs a 100 μs roundtrip delay. Since BS test data output (TDO) changes only on the falling edge of TCK and BS test data input (TDI) is clocked on the rising edge of TCK, for a 50% duty cycle TCK there is only 0.5 cycles for a falling edge to travel to the FIA 207 and for data returning to FIU 206 (i.e., 0.5 cycle=100 μs). Hence, for this example, TCK must be slower than 5 kHz for proper operations. Additionally, due to the slow TCK frequency to accommodate long fiber delay, effectively updating the configuration PROMs of distributed units as previously discussed can be a challenge. Therefore, it becomes essential to slow down TCK for distributed system testing which has the disadvantage of increasing test and programming duration.

Another problem associated with the DBS is how to perform field update without on-site visits for the distributed RFUs 270. The design of the remote units must be robust enough so that a failure during remote field update does not cause the breakdown of the remote units and thus reduction of its reliability.

In order to obviate the deficiencies of the prior art and to address the above challenges, it is an object of the disclosure to present a novel distributed BS test bus architecture for transmitting BS TAP signals over a serial channel t 6 facilitate distributed system testing and remote field update of a DBS, thereby enabling the system testing as if the distributed units are on a backplane within the same chassis.

It is also an object of the disclosure to present a novel Slow-Fast method that facilitates efficient distributed system testing and remote filed updates of a DBS.

These objects and other advantages of the disclosed subject matter will be readily apparent to one skilled in the art to which the disclosure pertains from a perusal or the claims, the appended drawings, and the following detailed description of the preferred embodiments.

DETAILED DESCRIPTION

This disclosure presents a novel distributed boundary scan (BS) test bus architecture of transmitting IEEE 1149.1 Boundary Scan (a.k.a JTAG) Test Access Port (TAP) signals over a serial channel to facilitate distributed system testing and remote field update of a DBS. The disclosed BS test bus architecture enables the system testing as if the distributed units are on a backplane within the same chassis.

Figure 1:
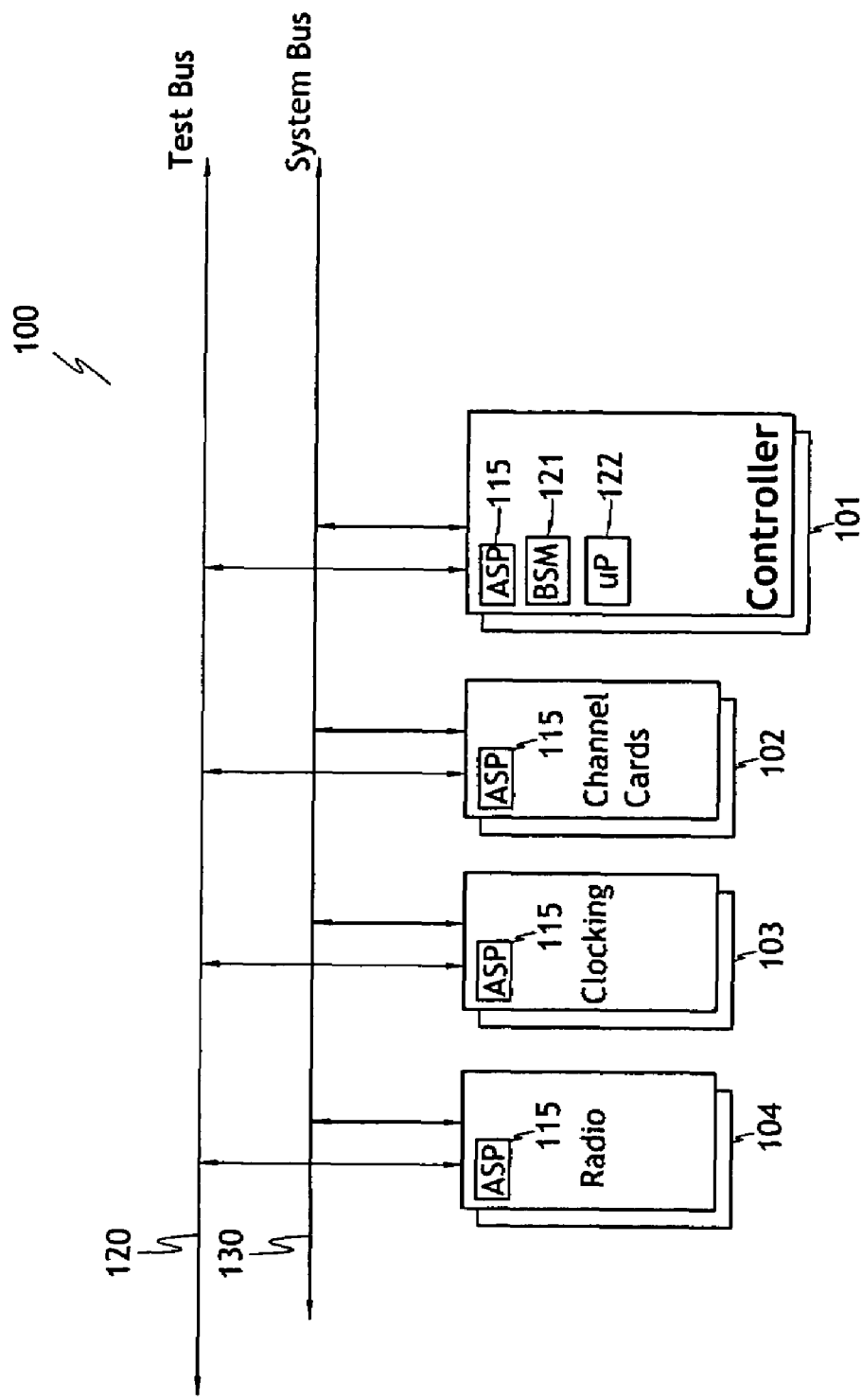
FIG. 1 is a representation of a traditional prior art Base Station.
Figure 2:
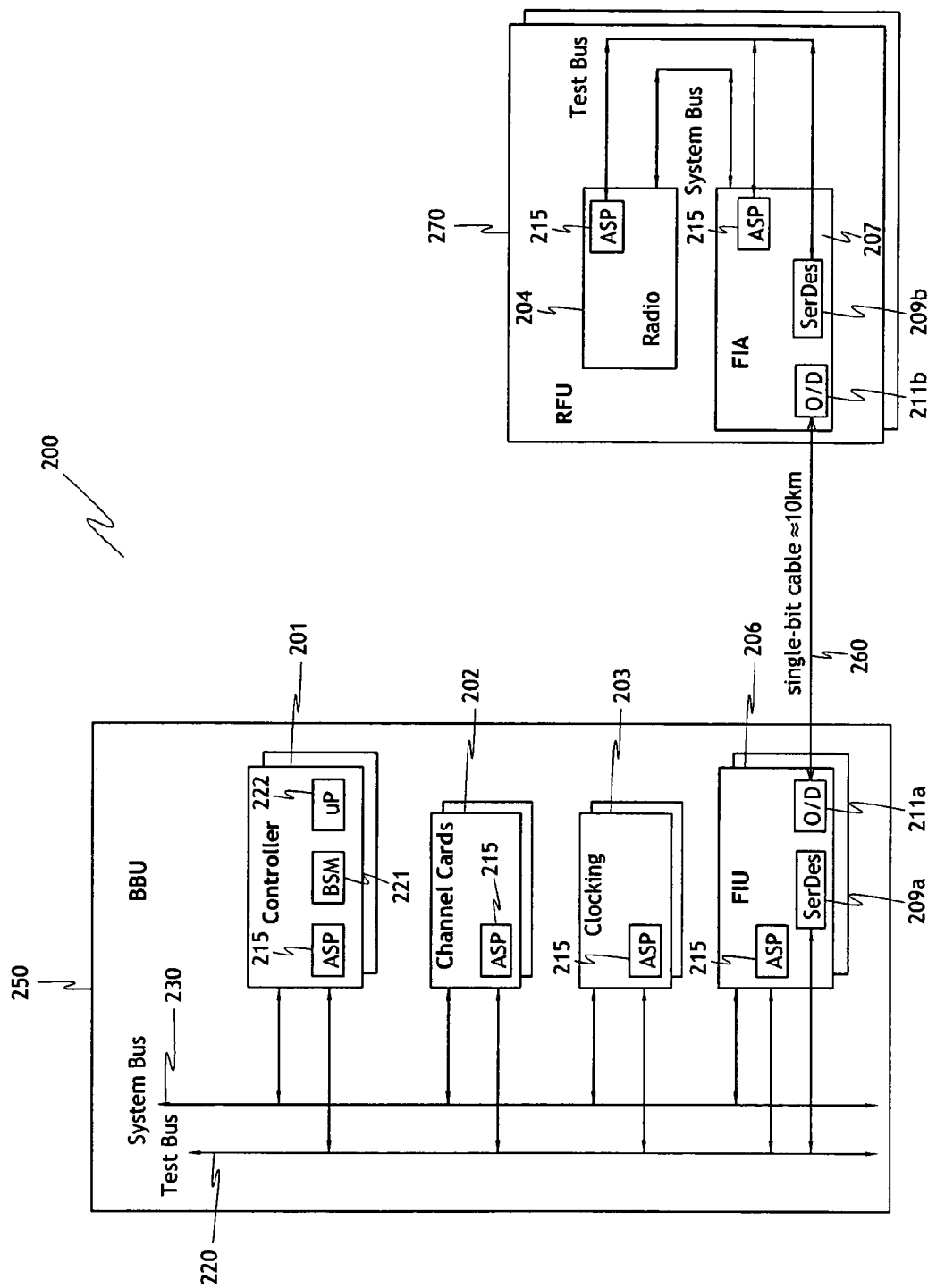
FIG. 2 is a representation of a Distributed Base Station.
Figure 3:
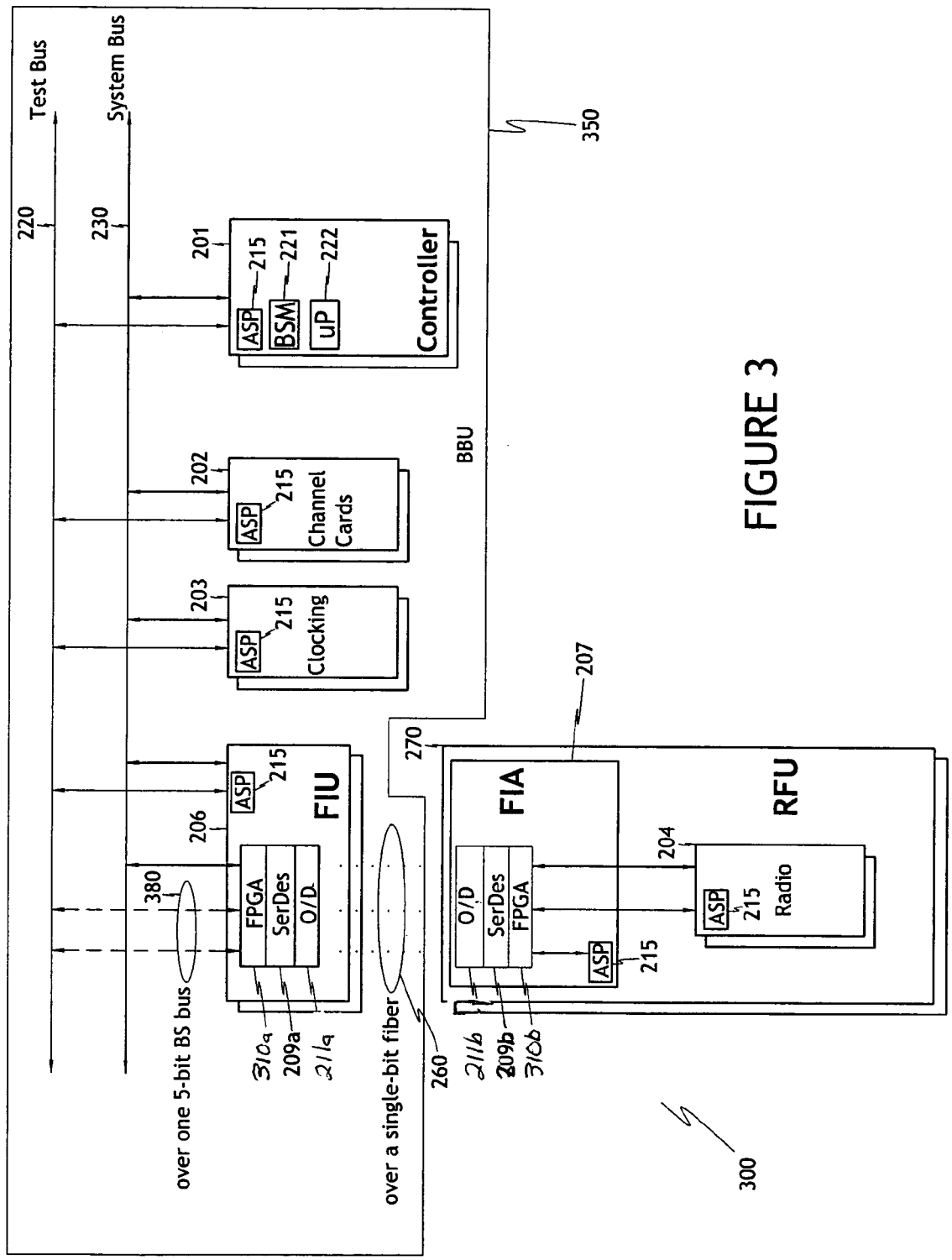
FIG. 3 is a representation of a Distributed Base Station for implementing Boundary Scan according to an embodiment of the present subject matter.

An embodiment of a DBS 300 is shown in FIG. 3. The DBS 300 is similar to the DBS 200 of FIG. 2; therefore, like elements have been given like reference numeral to facilitate an understanding of the present invention. The BBU 250 consists of controller boards 201, channel cards 202, clocking units 203 and FIUs 206 on one local backplane which includes a test bus 220 and a system bus 230. The single-bit fiber 260 connects the BBU 250 with a RFU 270 which has a radio card 204 and a FIA 207. The DBS 300 of FIG. 3 also includes a 5 bit BS bus 380 which provides a pair of virtual test bus connections. Both the FIA 207 and the FIU 206 contain a field programmable gate array (FPGA) 310a and 310b, a SerDes 209a and 209b and an optical/digital transceiver 211a and 211b. While an optical/digital transceiver is shown, it is not meant to limit the application of the disclosed subject matter; other types of transmission cable, which require other types of interfaces/decoders/converters are equally envisioned. The FPGA 310a and 310b implement overlapping and multiplexing compression techniques that are applied to the 5 tap signal as well as the data on the system bus to be transmitted between the pair of SerDes 209a and 209b via the single-bit fiber channel 260.

This disclosed distributed test architecture enables the distributed system testing as if the distributed FIAs 207 and radio cards 204 are on a backplane within the same chassis.

The FIA 207 is equipped with an ASP 215 device to ease the test and field update, although FIA 207 itself is a distributed backplane for radio cards. The FIA 207 is also treated as a board in the distributed test bus architecture as shown in FIG. 3.

Other aspects of distributed field testing (DFT) in the current application are also addressed in the disclosed architecture.

According to ASP protocols, each board in the system must be assigned to a unique 10 (ten) bit address, unique addresses other than 10 bit addresses are also equally envisioned. In traditional system test bus architecture, the 10-bit ASP address is assigned as a combination of a board ID and a slot ID, where the board ID is unique for each type of boards (e.g. channel cards, clocking cards, controller cards etc.) and the slot ID is unique for each slot in the system backplane. In the proposed distributed test bus architecture, the ASP address is assigned as the combination of board and slot IDs. However, the slot ID of FIA 207 and the radio card 204 in any of the RFUs 270 is identical to that of the corresponding FIU 206. That is, the FIA 207 and radio card 204 are treated as if they are plugged into the same slot of corresponding FIU 206 as shown in the distributed test architecture in FIG. 3. This slot ID is embedded in the data that is transmitted over the fiber 260 from the FIU 206 to the FIA 207.

In the multi-drop test bus architecture, only the primary TDO (PTDO) of the ASP with a matched 10-bit address of the ASP protocol is enabled to drive the test bus while the others are in high impedance. In the disclosed architecture, there are two logical links (i.e. virtual connections) over one 5-bit BS bus 380 that is connected to the multi-drop test bus 220 without the administration of an ASP device as shown in FIG. 3. Again, the 5-bit BS bus is for illustration only and other multi-bit BS buses are also envisioned. As a result, an ASP protocol watcher (not shown) is implemented to guarantee the proper TDO enabling in a multi-drop bus. The ASP watcher consists of at least a TAP controller and a simplified ASP protocol decoder. The ASP protocol watcher may be implemented in the fiber interface FPGA 310a or 310b of either the FIU 206 or FIA 207 to monitor the ASP protocol sent from BSM 221 to all ASPs 215. The PTDO is enabled when the ASP address matches either FIA 207 or the radio card 204 (only need to check the board ID since the slot ID for the corresponding FIU 206, FIA 207 and radio card 204 are identical) on the same slot. Otherwise, the PTDO remains (or changes to) disabled when an address is not matched.

As readily evident from FIG. 3, the disclosed test bus that connects the local system backplane with the distributed backplane is built over a functional channel. One consequence is that without the existence of a working clocking unit in BBU 250, the DBS is designed to shut off the serial fiber channel 260 as a fail-safe mechanism, which can preclude performing system test and field maintenance using the test bus as well. This defeats the purpose of having a test bus. Therefore, the FPGA 310a of the FIU 206 generates the clock for the fiber channel in the absence of a working clock unit 203 in the DBS.

Standards in wireless networking are advancing faster than the designs. Hence, system designs maximize use of programmable devices such as FPGAs, whose program contents are usually stored in configuration PROMs. Therefore, in-system field update for configuration PROMs of communication systems becomes an important issue. It is especially essential and costly for a DBS given the numbers of distributed RFUs 270 that need updating and are separated in long distances.

To minimize cost and to ease the field update for the DBS, the disclosed distributed test bus architecture and embedded boundary scan can be used advantageously to perform remote in-system field updates. That is, via the embedded software control and the distributed test bus architecture, configuration PROMs in each of the RFUs 270 can be accessed and updated remotely from a computer that is connected to a network (e.g. the internet) where the BBU 250 is connected.

However, to prevent an accidental breakdown of the DBS due to a failure during in-system remote update, it is advised to have at least a secondary configuration PROM for the FPGAs 310a and 310b as a backup. This is essential for the FLY 207, since once the fiber channel breaks down, there is no other way of remote accessing distributed RFUs 270 other than on-site visits.

As described earlier, due to the long fiber propagation delay, TCK must be slowed down significantly. Typically in the BSM 221 (where the TCK is generated for embedded BS), TCK can only reach the lower limit of 1/128 the speed of an input clock signal. However, once the BSM is set to be in the TAP manual mode, the TCK is automatically generated as the frequency of the microprocessor accessing one of the BSM control registers (CUTO registers). Using this software technique, the TCK can be generated as slow as 1 Hz to meet the requirement of Slow TCKs on a long fiber.

Due to the Slow TCK and large volumes of update data for PROMs, rather long programming times have resulted. However, it is fairly obvious that device updates carried out in the shortest time possible are desirable to minimize system down time.

Since not all the data for device update require a remote response, the requirement of slow TCK frequency to accommodate the significant fiber propagation delay is not manifested to those programming and test data phases that do not require remote responses. From this key premise, a novel programming method is provided for field updates in a DBS to provide efficient PROM programming. In general, a slow TCK is applied whenever a remote response is needed, since the roundtrip propagation delay must be considered, such as device ID test for BS integrity in the beginning of PROM programming. However, whenever the remote response is not needed or can be ignored during PROM programming, a fast TCK is applied, such as during the PROM memory programming phase. It is important to note that due to other factors, such as the fiber interface design as well as the over sampling frequency, the fast TCK frequency also has an upper bound which should not be exceeded. The fast TCK frequency can be predetermined, manually set or determined using experimental or empirical data.

Additionally, since the majority of the data for device updates are in the memory programming phase (where a fast TCK may be applied), time for field update may be reduced significantly, for example, from over an hour to less than 19 minutes on a 12 km fiber as shown in Table #1. However, this is still a significant amount of time for a system to be down. Additionally, device update can be accomplished without readback, i.e. without reading back PROM content bit-by-bit for verification right after the completion of memory programming phase. This technique can reduce the time for update further to 50 seconds as shown in Table 1.

For ease of remote field update operation for DBS, the algorithm automatically determines what the slow TCK frequency is and when it should be applied. In order to determine the slow TCK frequency, the method may include performing a ping test to determine if the circuit board containing the target device is present in the system. This is done before any programming data is applied to the device. It is during this test the method determines what the slow TCK frequency should be. This is accomplished by pinging the target board and waiting for acknowledgement. This is initially done at the highest possible frequency wherein the frequency may be incrementally reduced until remote acknowledgement is properly received (i.e., before the next clock period). Additionally, the method may be implemented from the programming data that are in Serial Vector Format (SVF) to automatically determine when a remote response is needed and to adjust the TCK frequency to the Fast TCK or the Slow TCK accordingly.

For example, there are four major phases in PROM programming data: erase, BS chain integrity check, memory programming and bit-by bit readback verification. Remote responses are required for integrity check and readback verification since the device ID codes and PROM program content must be read back from a remote unit over the long fiber cable. Therefore, the Slow TCK must be applied during these two phases, whereas the Fast TCK can be applied during the other phases.

Figure 4:
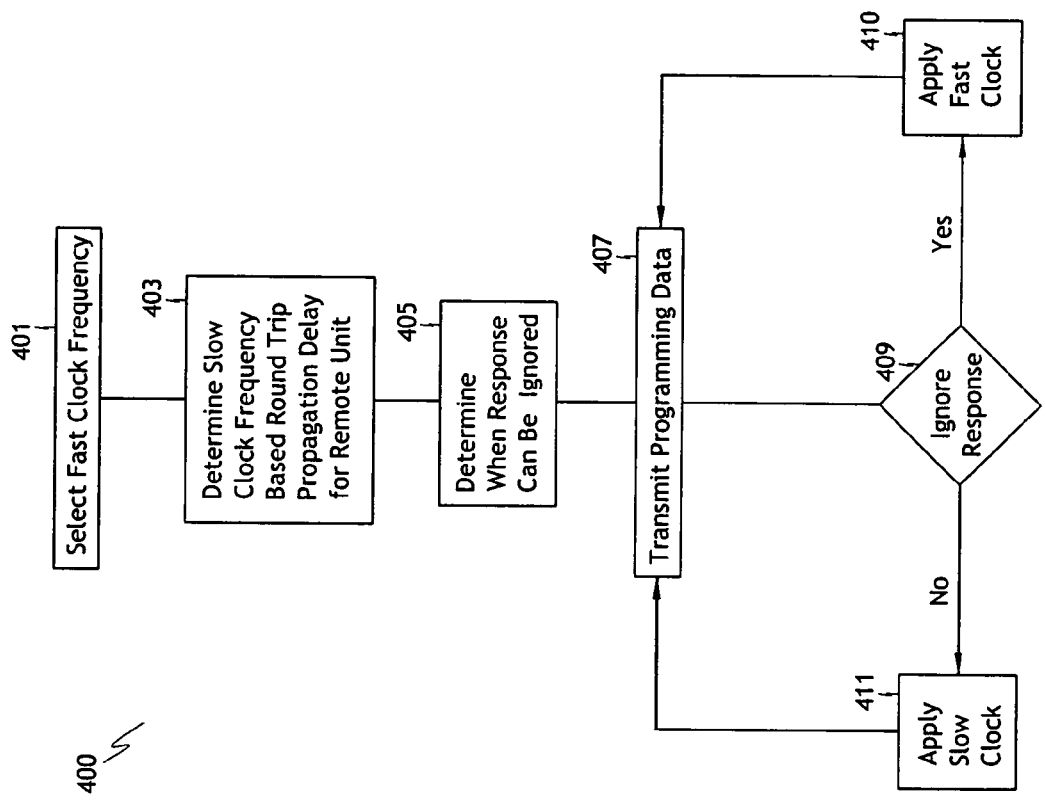
FIG. 4 is a representative flow chart for updating PROM in a Distributed System according to an embodiment of the present subject matter.

FIG. 4 is a representative flow chart for the slow fast programming method 400. A fast CLK frequency is selected in Block 401, which is within the operation bound of the system as discussed previously. The system then determines the slow clock frequency in Block 403, which is based on the round trip propagation delay for communication with the remote unit. This determination can be based on theoretical or historical values or can be determined in real time through the ping test as described previously. The system then determines which phases or portions of the programming data need remote responses as shown in Block 405. As discussed previously, this step can also be done concurrently with the application of the programming data to the link. The programming data is applied across the link as shown in Block 407 and as shown in block 409 the remote response can be ignored if the programming data is applied with a fast CLK as shown in Block 410. If, however, the remote responses cannot be ignored, such as for integrity check and readback verification, programming data is applied with the slow CLK as shown in Block 411.

The Slow Fast programming method described above need not be limited to two clocks. If more than one device were to be configured over the same fiber in series, such that the propagation delay of one was different from the other, it is envisioned that several clock frequencies could be applied to the different phases and destinations of the programming data.

Experimental results with the distributed test bust architecture and remote field update embedded software with the Slow-Fast programming method over a fiber up to 12 km between a FIU 206 and a FIA 207 is shown in Table 1.

TABLE 1

| Slow TCK | Fast TCK | With Readback | Without Readback |
| --- | --- | --- | --- |
|  |  | 660 k bytes | 310 K bytes |
| 4 kHz | 4 kHz | >1 hour | ≈50 minutes |
| 4 kHz | 500 kHz | ≈19 minutes | ≈50 seconds |

Programming time for PROM remote field update is reduced significantly from over an hour to less than 19 minutes over a 12 km fiber when the Slow-Fast programming method is applied. It takes about 15 seconds for the field update programming data to be downloaded from a PC hard disk drive to the flash memory on the controller card via Ethernet connection for embedded BS applications.

As illustrated in Table 1, huge volumes of data are involved in memory programming and readback verification. The field update data size for program with readback is around 660 kbytes, and the field update data size for the programming without readback is around 310 kbytes. As discussed earlier, about half of the data for device update are in the memory programming phase, where the Fast TCK may be applied, thereby significantly reducing the time for field updates.

All the embedded BS software-features, such as BS integrity test, system test and remote field update, can be implemented as a part of system software functions for remote software control of the DBS. These are used for system integration test and for system maintenance during field operation.

Since TDO changes only on the falling edge of TCK and TDI is sampled on the rising edge of TCK, test data is available ½ TCK cycle ahead of the rising edge of TCK. Such a clocking scheme makes the ordering of multiplexing techniques irrelevant. Otherwise, due to the jitter of the clock signal over the fiber, it is always advised to multiplex data before the clock to avoid errors.

In the disclosed test architecture, the special ASP address assignment not only guarantees the uniqueness of the resulting ASP address, but also provides a consistent logical view of related FIUs, FIAs and radio cards. The ASP protocol watcher implemented in the fiber interface FPGA of the FIU ensures the integrity of multi-drop test bus.

In addition, the embedded BS test software takes advantage of the distributed test architecture to update the configuration PROMs of the distributed units remotely without on-site visits. A new programming protocol is also proposed for remote field update to effectively program the PROMs in a DBS.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. In a system with a base unit operably connected to a remote unit by a link and wherein there is a propagation delay associated with the length of the link, a method for providing efficient programming of the remote unit, wherein a first phase of programming data requires a response from the remote unit and second phase of programming data does not require a response from the remote unit, comprising:
    selecting a fast clock frequency;
    determining a slow clock frequency based upon the round trip propagation delay associated with the link between the base unit and the remote unit; and
    transmitting the phases of programming data at the fast clock frequency or the slow clock frequency based on the whether the programming data is from the second phase or first phase of programming data respectively;
    wherein the first phase of programming data comprises programming data associated with Boundary Scan (BS) testing.

2. The method according to claim 1, wherein the round trip propagation delay is greater than the fast clock period.

3. The method according to claim 1, wherein the length of the link is greater than 1 km.

4. The method according to claim 1, wherein the length is equal to or less than 12 km.

5. The method according to claim 1, wherein the step of determining the slow clock frequency comprises a ping test.

6. The method according to claim 5, wherein the base unit sends a signal at a clock frequency to the remote unit and monitors for a proper response.

7. The method according to claim 6, wherein if the base unit does not receive a proper response, the clock frequency is reduced until the base unit receives a proper response.

8. The method according to claim 1, wherein the first phase of programming data is selected from the group comprising Boundary Scan (BS) chain integrity check and readback verification.

9. The method according to claim 1, wherein the second phase of programming data is selected from the group comprising erase and memory programming.

10. In a system with a base unit operably connected to a remote unit by a link and wherein there is a propagation delay associated with the length of the link, a method for performing boundary scan testing of the base unit and the remote unit, the method comprising:
    performing a first testing phase using a clock frequency having a period greater than the round trip propagation delay associated with the link, wherein the first testing phase requires a response from the remote unit, wherein the first testing phase includes Boundary Scan (BS) testing; and
    performing a second testing phase using a clock frequency having a period less than the round trip propagation delay associated with the link, wherein the second testing phase does not require a response from the remote unit.

11. The method according to claim 10, wherein the base unit is a base band unit and the remote unit is radio frequency unit.

12. The method according to claim 10, wherein the link is a serial single bit fiber.

13. The method according to claim 10, wherein the system is distributed base station.

14. In a system having a base unit operably connected to a remote unit and wherein there is a round trip propagation delay between the base unit and the remote unit, a method for serially transmitting update data to the remote unit, the method comprising:
    transmitting a first portion of the update data at a first test clock frequency, wherein the first portion of the update data is update data requiring a response from the remote unit, wherein the first portion of the update data comprises update data associated with Boundary Scan (BS) testing, wherein the first test clock frequency is selected such that the period of the first test clock frequency is greater than the round trip propagation delay; and
    transmitting a second portion of the update data at a second test clock frequency, wherein the second portion of the update data is update data not requiring a response from the remote unit, wherein the second test clock frequency is selected such that the period of the second test clock frequency is less than the round trip propagation delay.

15. The method of claim 14, wherein the remote unit comprises a programmable ROM.

16. The method of claim 14, wherein the system is a distributed base station.

17. The method of claim 14, wherein the round trip propagation delay is a function of the distance between the base unit and the remote unit.

18. The method of claim 14, wherein the second test clock frequency is more than 10 times greater than the test clock frequency.

19. The method of claim 18, wherein the second test clock frequency is greater than 100 times the test clock frequency.

20. The method of claim 17, wherein the base unit and remote unit are operably connected by a serial fiber cable.

* * * * *

UNITED STATES PATENT AND TRADEMARK OFFICE
CERTIFICATE OF CORRECTION

PATENT NO. : 7,602,729 B2 Page 1 of 1
APPLICATION NO. : 10/893215
DATED : October 13, 2009
INVENTOR(S) : Wheatley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1398 days.

Signed and Sealed this

Fifth Day of October, 2010

David J. Kappos
*Director of the United States Patent and Trademark Office*